US012620062B2

(12) United States Patent
Kalkbrenner et al.

(10) Patent No.: US 12,620,062 B2
(45) Date of Patent: May 5, 2026

(54) METHOD FOR GENERATING AN OVERVIEW IMAGE OF AN OBJECT

(71) Applicant: CARL ZEISS MICROSCOPY GMBH, Jena (DE)

(72) Inventors: Thomas Kalkbrenner, Jena (DE); Joerg Engel, Jena (DE); Joerg Siebenmorgen, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 127 days.

(21) Appl. No.: 18/423,154

(22) Filed: Jan. 25, 2024

(65) Prior Publication Data

US 2024/0257313 A1 Aug. 1, 2024

(30) Foreign Application Priority Data

Jan. 31, 2023 (DE) ..................... 10 2023 200 784.3

(51) Int. Cl.
*G06T 5/50* (2006.01)
*G06V 10/141* (2022.01)

(52) U.S. Cl.
CPC .............. *G06T 5/50* (2013.01); *G06V 10/141* (2022.01); *G06T 2207/20221* (2013.01)

(58) Field of Classification Search
CPC ............ G06T 5/50; G06T 2207/20221; G06V 10/141
USPC ......................................................... 345/629
See application file for complete search history.

(56) References Cited

U.S. PATENT DOCUMENTS

| | | | |
|---|---|---|---|
| 10,989,909 B2 | 4/2021 | Siebenmorgen | |
| 2014/0362204 A1* | 12/2014 | Watanabe | G02B 21/365 |
| | | | 382/133 |
| 2016/0147058 A1* | 5/2016 | Yamada | H04N 25/61 |
| | | | 348/80 |
| 2019/0137743 A1 | 5/2019 | Schumann | |
| 2019/0353885 A1* | 11/2019 | Siebenmorgen | G06V 20/698 |
| 2020/0265570 A1* | 8/2020 | Stoppe | H04N 23/74 |
| 2021/0231936 A1* | 7/2021 | Kalkbrenner | G02B 21/0032 |
| 2021/0364775 A1* | 11/2021 | Langholz | G02B 21/26 |

(Continued)

FOREIGN PATENT DOCUMENTS

| | | |
|---|---|---|
| DE | 102016110988 A1 | 12/2017 |
| DE | 102018207821 A1 | 11/2019 |

*Primary Examiner* — Jin Ge

(74) *Attorney, Agent, or Firm* — Brake Hughes Bellermann LLP

(57) ABSTRACT

Generating an overview image of an object includes, during a first capture duration, scanning regions of the object along a trajectory with illumination radiation, where the trajectory is chosen individually on the basis of properties of the object. First images of the object which together with position data (x, y, z) of an absolute distance measurement system are stored as an individual overview image are captured during the scanning of the trajectory. During a second capture duration, at least regions of the object are scanned with illumination radiation, and second images are captured; regions of the object which have already been imaged during the first capture duration are not imaged again. The first images captured during the first capture duration and the second images captured during the second capture duration are merged to form a resultant overview image of the object.

12 Claims, 7 Drawing Sheets

(56) References Cited

U.S. PATENT DOCUMENTS

| | | | | |
|---|---|---|---|---|
| 2022/0076395 A1* | 3/2022 | Amthor | ...................... | G06T 7/11 |
| 2022/0276478 A1* | 9/2022 | Amthor | ................ | G02B 21/361 |

* cited by examiner

METHOD FOR GENERATING AN OVERVIEW IMAGE OF AN OBJECT

CROSS REFERENCE TO RELATED APPLICATION

This application claims priority under 35 U.S.C. § 119 to German Application No. 10 2023 200 784.3, filed Jan. 31, 2023, the disclosure of which is incorporated herein by reference in its entirety.

FIELD OF THE INVENTION

This disclosure relates to generating an overview image of an object, in particular, in the field of microscopy.

BACKGROUND

In the field of microscopy, it is common to fully or partly represent an object to be imaged (also referred to below as a sample) in an overview image before the actual image capture. This is used, for example, to assess the suitability of the object for the application of the imaging method provided and/or in order to identify regions of interests (ROI) of the object in advance.

Typically, overview images that have a lower resolution than the images captured by means of the actual imaging method are captured for this purpose. In addition, the lower-resolution images are not suitable, or suitable only to a very limited extent, for being magnified, that is to say for "zooming" in to specific image details.

Due to firmly predetermined scanning paths, the capture of an overview image, and also that of an actually desired image, commonly includes significant regions of the object field in which no relevant information is present, but whose image data are nevertheless stored and evaluated. For example, when using predetermined scanning paths, regions of a sample carrier (coverslip, petri dish etc.) on which no sample is located are frequently captured.

SUMMARY

This disclosure is based on the object of proposing one possibility for generating an overview image of an object, in which magnifications of image details while gaining information are possible and a more efficient capture of an object field can be achieved.

The object is achieved by a by the techniques disclosed herein.

The disclosed techniques can be used for generating an overview image of an object, in particular, in the field of microscopy. As will be discussed further below, particular advantages can be achieved when the disclosed techniques are applied to the field of light-sheet microscopy (or single-plane illumination microscopy; SPIM).

Image data of the object are recorded and processed during a first and a second capture duration. A set of image data and images obtained during the first capture duration and, if appropriate, an image generated therefrom will also be referred to below as an individual overview image.

During the first capture duration, regions of the object are scanned along a trajectory using illumination radiation, in particular, shaped illumination radiation, in particular, laser radiation. In the process, the trajectory is chosen individually on the basis of properties, for example, the size, the shape and/or the nature of the object and/or the obtained image information related to the object. In other words, the manifestation of the trajectory is determined individually by each object to be imaged. Repeated use of the method for one at the same object then results in different trajectories.

During the scanning of the trajectory, first images of the object are captured, which are stored together with the position data from a global positioning system or an absolute distance measurement system. An absolute distance measurement system enables at any time the unambiguous indication of a position of the point of the object. For example, such an absolute distance measurement system can be aligned with a microscope having a displaceable sample stage. When the object is moved by means of the sample stage and/or shaped illumination radiation used is deflected, the positions thereof in relation to one another can be unambiguously determined at any time.

During the performance of the method, at least regions of the object are scanned with, in particular, shaped, illumination radiation during a second capture duration and second images are captured. The regions of the object which have already been imaged during the first capture duration by means of the first images are not imaged again, or are imaged again only at a small proportion.

Due to the illumination expanding for reasons of technology and the object region inevitably captured, regions imaged by means of the first images may overlap with regions imaged by means of the second images. It can be desirable that the proportion of such overlaps should be kept as small as possible. The proportion of regions captured both by means of the first images and also by means of the second images should in this case be no more than 50%, advantageously no more than 25%, preferably no more than 10%.

In order to obtain a resultant overview image, the first images captured during the first capture duration and the second images captured during the second capture duration are merged to form the resultant overview image (also: systematic overview image) of the object.

A systematic overview image, or an overview image captured systematically, is understood to mean an image that is generated from a set of image data whose points of origin were previously defined. For example, routine scanning of an object field, for example, along a predetermined scanning path, without taking account of the actual manifestation of the individual sample, provides a systematic overview image.

Among other things, the techniques described herein are based on the observation that the object to be imaged is commonly observed by a user in part and by way of an overview before the actual capture of an overview image is carried out in order to gather a first impression of the quality and suitability thereof (individual preview). During the course of this, the object is inevitably exposed, which, in sensitive samples, may already lead to undesired bleaching processes in the illuminated regions. Particularly relevant are bleaching processes in biological samples that are provided (labelled) with fluorescence markers, because such fluorescence markers cannot be excited an infinite number of times.

In the disclosed techniques, the individual preview of the sample by the user does not go unused, and image data are already gathered on this occasion in order to reduce undesired bleaching of the sample, increase the quality of the overview image and support subsequent image capturing. This takes advantage of the fact that, based on the user's experience, regions of the object that have lesser relevance are identified and avoided by the user or are captured only for a short time during dynamic scanning along an instantaneously produced trajectory.

The disclosed techniques enable the creation of a resultant overview image with one recording method/image-generating method, while the actual image capturing of the object can take place with a different image-generating method. It is also possible that the actual image-generation takes place differently locally, for example, taking into account the results obtained from the resultant overview image.

In this way it is possible to utilize an analysis of the resultant overview image to generate position-specific control commands that lead to locally adapted image capturing. In addition to adapting parameters of the illumination radiation (e.g. duration and/or intensity), it is possible, for example, depending on the position, for a change in the wavelength of the illumination radiation directed at the object to take place.

It is also possible for the type of imaging method and/or parameters of the illumination radiation to already be adapted to the information currently obtained during the scanning of the trajectory during the first capture duration. Thus, a user can already select the type of the currently used imaging method during the preview. It is also possible during the second capture duration, for example, depending on additional information present during the first capture duration, to select the type of imaging method and/or parameters of the illumination radiation and/or vary it/them depending on the position.

In one possible implementation, the choice of the trajectory and the guidance of the illumination radiation along the trajectory during the first capture duration can be achieved manually. For this purpose, the captured image data can already be presented to a user during the scanning of the sample along the trajectory, with the result that the user can follow simultaneously the construction and the progress during the capturing of the overview image by means of the first images and, if required, intervene quickly and directly in the further course of the trajectory. For example, the user can deflect the illumination radiation by means of a controllable apparatus for steering the beam, for example by means of a scanner. In addition, or alternatively, the object can be moved in relation to the illumination radiation, for example, by moving a sample stage by means of actuating its drives.

It is also possible to choose the trajectory and guide the illumination radiation along the trajectory during the first capture duration by applying an algorithm. In this case, a starting point and/or an end point of the trajectory is, in particular, randomly chosen. This results in each case in individual trajectories that are modified due to the object.

An algorithm can be provided here by way of a method of image data analysis that is as simple as possible. For example, a random trajectory can be defined and/or adapted on the basis of the respective currently captured image data. For example, the direction of the trajectory can be changed if it is detected by means of the analysis of the current image data that the periphery of the object has been reached. In further implementations, the trajectory can be realized and/or the regions to be imaged as second images can be defined using machine learning methods or using artificial intelligence.

The first images captured during the first capture duration can advantageously be used to adapt, in particular, restrict, at least one region to be scanned during the second capture duration (scanning region). In particular only those regions of which no images were captured during the first capture duration still need to be scanned during the second capture duration.

The regions to be imaged during the second capture duration can optionally be modified further if, for example during the first image capture duration, at least one additional piece of information is assigned to at least a selection of the first images and is stored together with the respective first image. Such additional information can be "flags", by means of which for example ROIs or boundaries of the object and/or its structures can be marked.

To prevent repeated capturing of image data, the capturing of an image can be triggered in one advantageous implementation of the method when the illumination radiation has been guided along the trajectory for a minimum distance since a previous image was captured. In this way it is possible for a user for example to make minor location changes at one position without undesirably capturing several images. Such a minimum distance can be provided both for capturing images during the first capture duration and also during the second capture duration.

The illumination radiation in some implementations is shaped, as has already been mentioned, in the form of an illumination line (from now on also referred to as line, for short) or of a light sheet extending in a single plane.

The light sheet can be produced as a static light sheet, for example, by shaping the illumination radiation through the effect of at least one cylindrical lens. In addition or alternatively, a light sheet can be produced dynamically by moving a beam of rays back-and-forth in one plane, for example, by means of a scanner.

In a further implementation, the light sheet can be in the form of what is known as a lattice light sheet. In this case, a plurality of non-diffractive beams, in particular, Bessel beams, arranged next to one another along a line are produced through the effect of a modulator, for example, a spatial light modulator (SLM). Their manifestations and spacings are set such that undesired side lobes (for example rings of the Bessel beams) substantially cancel each other due to destructive interference. The Bessel beams that have been modified in this way are together moved back and forth along the line, as a result of which a light sheet having a very small thickness can be produced.

Advantageously, an arrangement for light-sheet microscopy is implemented and used in the form of an inverse arrangement. The shaped illumination radiation is directed here at a sample carrier holding the object at a non-zero angle to a normal (reference axis) of a sample plane. A detection beam path is directed at the sample carrier arranged in a sample plane at an angle of in particular 90° to the beam path of the illumination radiation. Both beam paths pass through the sample carrier, in particular through its bottom or side walls, and intersect in a sample space in which the object to be imaged is arranged, or can be arranged.

Advantages of an inverse arrangement are easy accessibility of the sample carrier and of the object. In addition, the optical elements, such as an illumination objective and a detection objective, can be better protected against contamination.

In the case of both illumination radiation shaped into a light sheet and illumination radiation shaped into a line, it is possible for an overlap, even a complete overlap, of the object field to be imaged to occur under certain circumstances when the illumination radiation is shifted precisely in the plane of the light sheet or by a short distance exactly in the direction of the line, or if the sample is correspondingly moved. In order to avoid such redundant image data, a further first image of the method is captured in an advantageous implementation only when the illumination radiation has been guided by a minimum distance along the trajectory since a preceding first image was captured and at an angle greater than zero to the light sheet plane or to the direction of the illumination line. When capturing the second images during the second capture duration, the method can proceed accordingly.

Image capturing with an assignment of position information of the absolute distance measurement system requires synchronization of the control of a detector used for image capturing and of an apparatus for beam steering or of the drives of an adjustable sample stage. Such synchronization of the image capturing and the movement of the illumination radiation along the trajectory can take place by means of a software solution, for example, using a software controller, or supported by hardware.

The individual overview image generated from the captured first images and/or the resultant overview image can be graphically presented to a user on a display. It can be presented here optionally by means of a maximum intensity projection.

In summary, the advantages of the invention can be considered to lie in the fact that the preview is already used to capture image data. In addition, data capturing based on the user's experience is more efficient than a predetermined scanning of the object.

BRIEF DESCRIPTION OF THE DRAWINGS

The invention is explained in more detail below on the basis of exemplary embodiments and drawings, in which.

DETAILED DESCRIPTION

Figure 1:
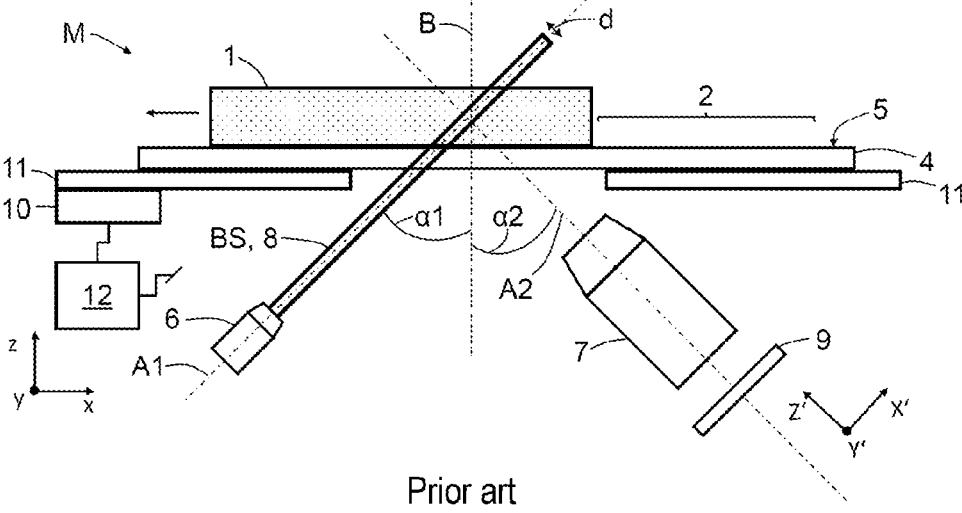
FIG. 1 shows a schematic illustration of an inverse light-sheet microscope according to the prior art.

FIG. 1 shows in simplified form an inverse microscope M for light-sheet microscopy according to the prior art, as can also be used with a few control-technological adaptations for the method according to some implementations. An object 1 to be imaged is arranged on a sample carrier 4 having an upward-facing surface that serves as a sample plane 5. The sample carrier 4 is arranged on a sample stage 11, which is adjustable controlled by at least one drive 10. An illumination objective 6 is directed with its first optical axis A1 through the sample carrier 4 into the sample plane 5 and into the object 1. For the sake of simplicity, the space (sample space) above the upward-facing surface of the sample carrier 4 is likewise referred to as the sample plane 5. The illumination objective 6 is designed such that, by means of it and possible further elements (not illustrated here) such as an SLM, a cylindrical lens or a scanner, illumination radiation BS in the form of a light sheet 8 can be generated substantially in the sample plane 5 along the first optical axis A1 and perpendicularly to the drawing plane (light-sheet plane; X'-Y'). The light sheet 8 is therefore shown in a lateral cross section with a thickness d transversely to the light-sheet plane in the direction of the first optical axis A1. The thickness d analogously also applies to a line illumination for example according to FIG. 6.

A detection objective 7, which is likewise present, is likewise directed with its optical axis, which is referred to as the second optical axis A2, through the sample carrier 4 into the sample plane 5 and the object 1. Both the first optical axis A1 and the second optical axis A2 enclose in each case a non-zero angle with respect to a reference axis B (normal of the sample plane 5), which is perpendicular to the sample plane 5, the angles being referred to here as $\alpha 1$ and $\alpha 2$. The first optical axis A1 and the second optical axis A2 intersect in the sample plane 5 and are at an angle of 90° with respect to one another ($\alpha 1+\alpha 2=90°$). A focal position or focal plane of the detection objective 7 coincides with the light sheet 8, such that a region located in the light sheet 8 is imaged sharply into an image plane of a detector 9 by means of the detection objective 7.

FIG. 1 indicates two coordinate systems. The Cartesian coordinate system with the axes x, y and z is related in particular to the sample carrier 4, the sample plane 5, and the reference axis B. The sample plane 5 extends in an x-y-plane which is defined by the axes x and y (x-axis and/or y-axis), while the reference axis B extends in the direction of the axis z (z-axis).

A second coordinate system with the axes X', Y' and Z' relates, in particular, to the first and the second optical axes A1 and A2. The first optical axis A1 is directed parallel to an X'-Y'-plane defined by the two axes X' and Y'. The second optical axis A2 is directed in the direction of the Z'-axis and thus also parallel to a Z'-Y'-plane defined by the two axes Z' and Y'.

The object 1 is moved relative to the light sheet 8 along the sample plane 5 in the direction of the axis x and/or axis y (symbolized by an arrow). In each case image data are captured in the process at different time points and in each case stored as captured image data.

The detector 9 used permits two-dimensional location assignment of the captured detection radiation by ascertaining the origin of the latter. This can be effected, by way of example, by means of a position-sensitive detector 9 having an array of detection elements (matrix).

A controller 12, which is likewise present, in the form of a microcontroller, a computer or an FPGA, for example, is connected in each case in a manner suitable for the transmission of data to the at least one drive 10 of the sample stage 11 and optionally to the detector 9.

In order to obtain a systematic overview image, the drives 10 are controlled by means of the control unit 12 in a manner such that the object 1 is moved on a defined trajectory in the direction of the axis x and/or the axis y, until the defined trajectory has been completely travelled. No consideration is taken here of what properties the relevant object 1 has, which means that even larger regions 2 (shown by way of example) in which the object 1 is not present are captured.

The light sheet 8 can be dynamically generated according to the prior art with a Gaussian beam profile. In some implementations, the light sheet 8 can be generated with a non-refractive beam profile, for example as a Bessel beam or as a sinc3 beam, or as a lattice light sheet (see above).

Figure 2:
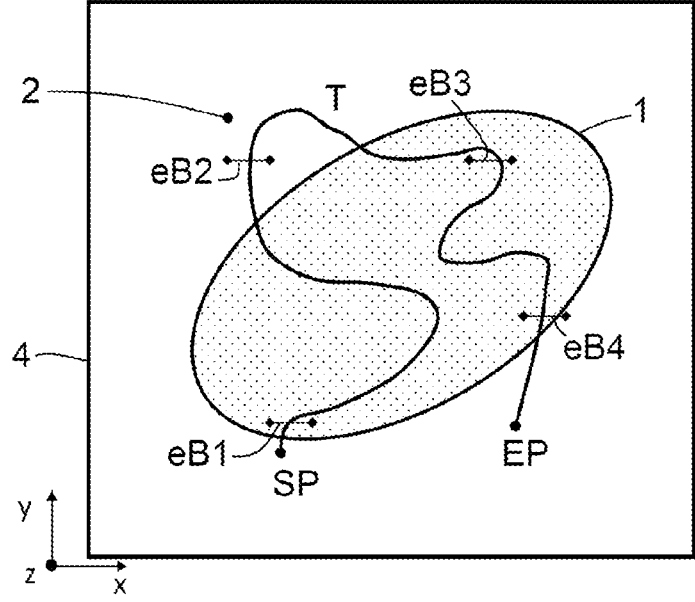
FIG. 2 shows an illustration of the procedure according to some implementations during a first capture duration.

FIG. 2 shows by way of example a trajectory T, along which first images cBn (an exemplary selection of first images is denoted by eB1 to eB4) are captured in some implementations during a first capture duration. Starting from a starting point SP, selected randomly for example, the sample stage 11 is displaced in the direction of the axes x, y and optionally also z, and in each case after a specific time duration and/or after a minimum distance, a first image eBn of the object 1 illuminated with the shaped illumination radiation BS is captured and stored with the respectively associated position information from an absolute distance measurement system. In the example shown, the trajectory T chosen individually by a user extends beyond the boundary of the object 1 in the top left region 2 of FIG. 2. Due to this information based on the properties size and shape of the object 1, the direction of the trajectory 3 is changed by the user so that the trajectory T is guided back again to the object 1 and extends within the boundaries of the object 1. The first capture duration ends when an end point EP of the trajectory T has been reached. In further implementations, the endpoint EP can be defined individually or randomly.

Figure 3:
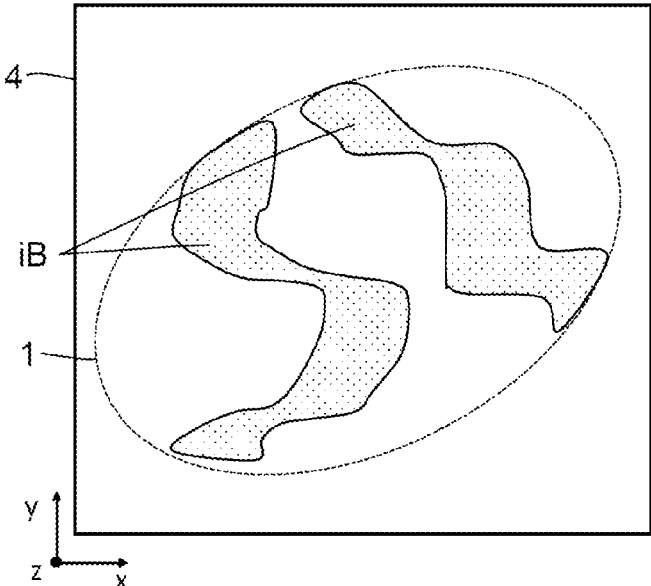
FIG. 3 shows an illustration of an individual overview image obtained during the first capture duration.

FIG. 3 shows an individual overview image iB generated on the basis of the chosen trajectory T relating to FIG. 2 and the first images eBn (with n=1, 2, 3, . . . , m) captured in the process. The outline of the object 1 is shown for illustrative purposes with a dashed full line.

Figure 4:
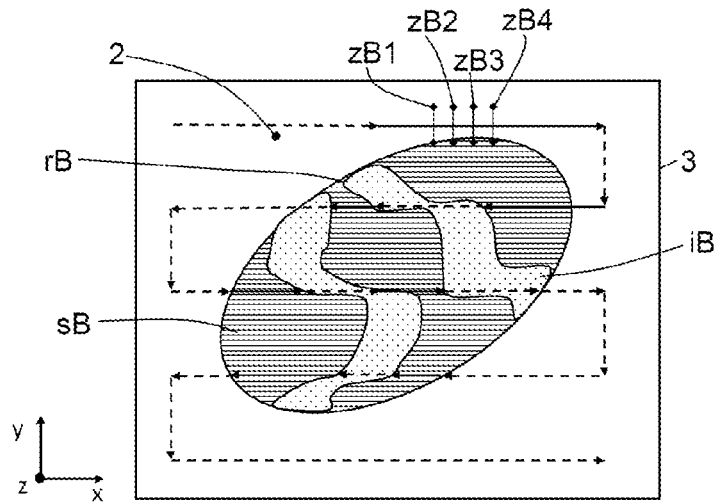
FIG. 4 shows a schematic illustration of a resultant overview image.

The image data of the individual overview image iB (illustrated with a point pattern) obtained during the first capture duration are taken into consideration in an image capturing in a second capture duration. The object 1 is scanned systematically during the second capture duration. Such systematic scanning along a predetermined scanning path is illustrated by way of example with arrows in FIG. 4. The regions of the object 1 already captured by means of the first images eBn are not captured again. In addition, the knowledge relating to the position and the course of the boundaries of the object 1 obtained during the first capture duration can be utilized to not capture second images zBn along sections of the scanning path (for example shown by arrows with a dashed line). In this way, for example the regions 2 at the top left next to the object 1 and below it can be excluded from capturing.

A resultant overview image rB, which is stored and optionally presented on a display 3, is generated from the first images eBn captured during the first capture duration and the second images zBn (with n=1, 2, 3, . . . , p) captured during the second capture duration.

Figure 5:
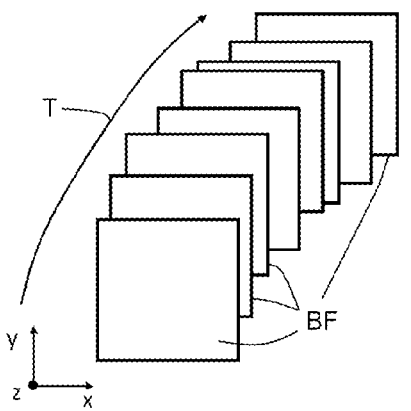
FIG. 5 shows a schematic comparison of mutually overlapping partial images according to the prior art.
Figure 5:
Figure 6:
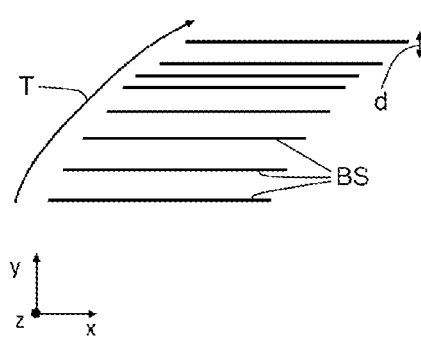
FIG. 6 shows a schematic comparison of mutually overlapping partial images according to some implementations.

The advantage of using a light sheet or line for the illumination is illustrated in FIGS. 5 and 6.

FIG. 5 shows by way of example a number of image fields BF, which are obtained during the capture of partial regions of an overview image known from the prior art. The image fields BF significantly overlap one another due to the illumination and the detection substantially along the axis z. A proportion of the image data which are present several times due to the overlaps is used to stitch together the overview image (tiling) from the images of the partial regions so as to be correct in terms of location and orientation. It is easy to see from FIG. 5 that some regions of the object 1 are illuminated several times, which may result in the aforementioned undesired bleaching processes.

By contrast, a respective other region of the object 1 is illuminated by means of illumination radiation BS (FIG. 6) shaped into a line and captured when the line was moved along the trajectory T by at least a distance that corresponds to its thickness d. What was stated regarding the line also accordingly applies to illumination radiation BS that has been shaped into the light sheet 8, because even an offset by at least the thickness d of the light sheet 8 already captures a region that was hitherto not illuminated.

Figure 7:
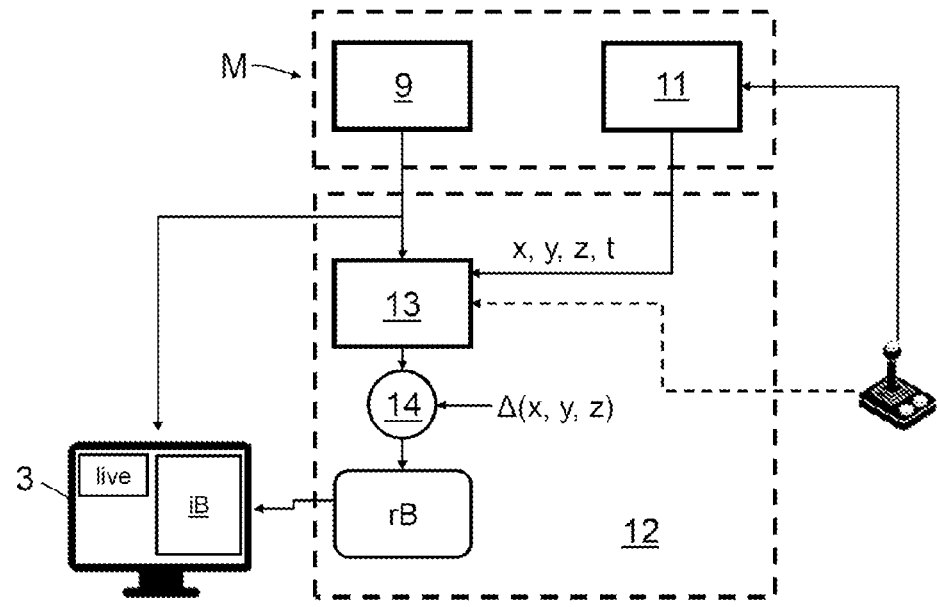
FIG. 7 shows a schematic illustration of a microscope configured to perform disclosed techniques.

Carrying out the disclosed techniques by means of a microscope M is described on the basis of FIG. 7. A user, here symbolized by the control panel/joystick, controls a scanner or the sample stage 11, wherein an individual trajectory T is followed. The detector 9 captures for example first images eBn at a fixed temporal rate. A current image or an individual overview image iB of the object 1 ("live") generated during the scanning along the trajectory T can be shown on a display 3. For the microscope M, in particular for the sample stage 11, an absolute distance measurement system has been set up. The position data thereof are captured per time point by a position logger 13. If during the first capture duration a first image eBn is captured at a time point tn, the associated position data x, y, z are assigned thereto and stored for example as the meta data thereof.

Optionally, the user can assign further meta data to the first image eBn for example by providing an image with a flag for an ROI or for reaching the boundary of the imaged object 1 (shown with an interrupted full line).

A threshold value comparator 14 which may optionally be present serves for comparing the position data of a previous first image eBn−1 with a current first image eBn. If the positions are not located at a far enough distance from one another, the current image eBn is not stored. It is also possible that the position data are compared by means of the threshold value comparator 14 and the detector 9 is activated for image capturing only when a minimum distance along the trajectory T has been travelled since the previous first image eBn−1.

A similar procedure can be carried out during the second capture duration, wherein the first images eBn which were already obtained, and stored, during the first capture duration are taken into account. The image capturing during the second capture duration then advantageously takes place systematically, for example, with the aid of a scanning of the object 1 which is controlled and automated by the controller 12 (software controller).

Figure 8:
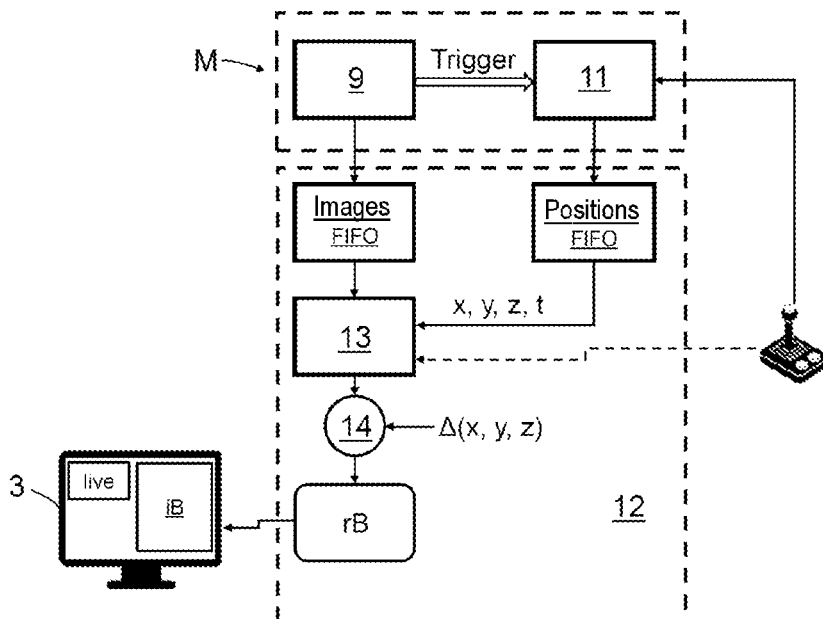
FIG. 8 shows a schematic illustration of a microscope configured to perform the disclosed techniques with a hardware-supported synchronization of the image capturing and the movement of the illumination radiation.

FIG. 8 illustrates a design of the microscope M and an implementation of the method according to the invention in which the sample stage 11 transmits current position data x, y, z to the controller 12 as a reaction to a trigger signal from the detector 9. A chronologically ordered list of positions of the sample stage 11 is obtained, which are accordingly assigned as meta data to the respective first images eBn (hardware-supported synchronization). The optional use of the threshold value comparator 14 is likewise possible. In the exemplary embodiment, the positions or the images eBn, optionally also the images zBn, are organized according to what is known as the FIFO ("first in, first out") principle.

REFERENCE SIGNS

1 Object
2 Region
3 Display
4 Sample carrier
5 Sample plane
6 Illumination objective
7 Detection objective
8 Light sheet
9 Detector
10 Drive
11 Sample stage
12 Controller
13 Position logger

14 Threshold value comparator
A1 First optical axis
A2 Second optical axis
B Reference axis
BF Image field
BS Illumination radiation
M Microscope
α1 Angle
α2 Angle
d Thickness
eBn First images
zBn Second images
EP End point
SP Starting point
T Trajectory
iB Individual overview image
rB Resultant overview image
sB Systematic overview image

The invention claimed is:

1. A method for generating an overview image of an object, the method comprising:
   scanning with illumination radiation, during a first capture duration, first regions of the object along a trajectory, wherein the trajectory is chosen individually based on properties of the object;
   capturing, while scanning the illumination radiation along the trajectory during the first capture duration, first images of the first regions of the object;
   storing the first images of the object together with position data (x, y, z) of an absolute distance measurement system for the first images as an individual overview image;
   scanning with illumination radiation, during a second capture duration, at least second regions of the object;
   capturing, while scanning the illumination radiation during the second capture duration, second images of the second regions of the object, wherein the first regions of the object, images of which that have already been imaged during the first capture duration, are not scanned with illumination and imaged again or are scanned with illumination and imaged again only at a proportion of no more than 50%, during the second capture duration, and wherein the captured second images of the second regions of the object do not overlap the captured first images of the first regions of the object or overlap the captured first images of the first regions of the object at a proportion of no more than 50%; and
   merging the first images captured during the first capture duration and the second images captured during the second capture duration to form a resultant overview image of the object, wherein merging the first images captured during the first capture duration and the second images captured during the second capture duration to form a resultant overview image of the object is based on the position data (x, y, z) of the absolute distance measurement system for the first images and on position data (x, y, z) of the absolute distance measurement system for the second images.

2. The method according to claim 1, wherein the choice of the trajectory and guidance of the illumination radiation along the trajectory during the first capture duration is achieved manually.

3. The method according to claim 1, wherein the choice of the trajectory and guidance of the illumination radiation along the trajectory during the first capture duration is achieved by applying an algorithm, wherein a starting point and/or an end point of the trajectory (T) is chosen individually.

4. The method according to claim 1, further comprising selecting the second regions to be scanned during the second capture duration based on the first images.

5. The method according to claim 1, further comprising:
   during the first capture duration, assigning at least one additional piece of information to at least one of the first images; and
   storing the at least one piece of information together with the to at least one of the first images.

6. The method according to claim 1, further comprising:
   determining that the illumination radiation has been guided by a minimum distance along the trajectory since a previous first image was captured; and
   based on the determination, capturing a further first image.

7. The method according to claim 1, wherein the illumination radiation is shaped as a line.

8. The method according to claim 1, wherein the illumination radiation is shaped as a light sheet extending in a single plane.

9. The method according to claim 8, further comprising:
   determining that the illumination radiation has been guided by a minimum distance along the trajectory since a previous first image was captured and at an angle greater than zero to the light sheet plane; and
   based on the determination, capturing a further first image.

10. The method according to claim 8, wherein the first images captured during the first capture duration are subjected to a maximum intensity projection of the illumination radiation.

11. The method according to claim 1, wherein the first regions of the object, images of which that have already been imaged during the first capture duration, are not scanned with illumination and imaged again or are scanned with illumination and imaged again only at a proportion of no more than 10%, during the second capture duration, and wherein the captured second images of the second regions of the object do not overlap the captured first images of the first regions of the object or overlap the captured first images of the first regions of the object at a proportion of no more than 10%.

12. The method according to claim 1, wherein the first regions of the object, images of which that have already been imaged during the first capture duration, are not scanned with illumination and imaged again during the second capture duration, and wherein the captured second images of the second regions of the object do not overlap the captured first images of the first regions of the object.

* * * * *